(12) United States Patent
Cao et al.

(10) Patent No.: US 10,262,847 B2
(45) Date of Patent: Apr. 16, 2019

(54) PHOTOMULTIPLIER TUBE AND METHOD OF MAKING IT

(71) Applicant: Shenzhen Genorivision Technology Co., Ltd., Shenzhen (CN)

(72) Inventors: Peiyan Cao, Shenzhen (CN); Yurun Liu, Shenzhen (CN)

(73) Assignee: SHENZHEN GENORIVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/737,777

(22) PCT Filed: Oct. 5, 2015

(86) PCT No.: PCT/CN2015/091420
§ 371 (c)(1),
(2) Date: Dec. 19, 2017

(87) PCT Pub. No.: WO2017/059558
PCT Pub. Date: Apr. 13, 2017

(65) Prior Publication Data
US 2019/0006158 A1 Jan. 3, 2019

(51) Int. Cl.
*H01J 43/04* (2006.01)
*H01J 43/18* (2006.01)
*H01J 43/20* (2006.01)
*G01J 1/44* (2006.01)
*G01T 1/28* (2006.01)

(52) U.S. Cl.
CPC .............. *H01J 43/18* (2013.01); *H01J 43/20* (2013.01); *G01J 1/44* (2013.01); *G01J 2001/4453* (2013.01); *G01T 1/28* (2013.01)

(58) Field of Classification Search
USPC ............................ 313/532, 533, 103 R, 104
See application file for complete search history.

(56) References Cited

U.S. PATENT DOCUMENTS

| 3,435,233 A | 3/1969 | Farnsworth |
| 4,117,366 A | 9/1978 | Davis |
| 4,182,968 A | 1/1980 | Endriz et al. |
| 5,306,904 A | 4/1994 | Shimabukuro et al. |
| 5,598,061 A | 1/1997 | Nakamura et al. |

*Primary Examiner* — Vip Patel
(74) *Attorney, Agent, or Firm* — Na Xu; IPro, PLLC

(57) ABSTRACT

A photomultiplier tube (PMT) suitable for detecting a photon, comprising: an electron ejector configured for emitting primary electrons in response to an incident photon; a detector configured for collecting electrons and providing an output signal representative of the incident photon; and a series of vertical electrodes between the electron ejector and the detector, wherein each of the vertical electrodes is configured for emitting secondary electrons in response to incident electrons, and each of the vertical electrodes is parallel to a straight line connecting the electron ejector and the detector.

17 Claims, 18 Drawing Sheets

PHOTOMULTIPLIER TUBE AND METHOD OF MAKING IT

TECHNICAL FIELD

The disclosure herein relates to tubes, particularly relates to a photomultiplier tube and a method of making it.

BACKGROUND

A phototube, or photoelectric cell, or photo-emissive cell, may be a sensitive detector of light in the ultraviolet, visible, and near-infrared ranges of the electromagnetic spectrum.

A photomultiplier tube (PMT) is a vacuum phototube that is able to multiply the current produced by incident light by many times, thus enabling individual photons to be detected when the incident flux of light is very low. Photomultiplier tubes have important applications in nuclear and particle physics, astronomy, medical diagnostics including blood tests, medical imaging, motion picture film scanning, radar jamming, and high-end image scanners known as drum scanners.

As shown in FIG. 1, a conventional PMT 100 includes a housing 101 containing a photocathode 102, several dynodes 104 and an electron collector 110. Light entering the tube 100 and incident on the photocathode 102 causes electrons to be emitted by the photocathode 102, as a consequence of the photoelectric effect. The electrons impinge on the successive dynodes 104, causing electron multiplication by secondary emission. After impingement on the last dynode, the electrons are collected by the collector 110 and used for detection of the incident light.

Although being widely used, the conventional PMT 100 is huge, heavy, fragile, expensive and difficult to produce.

SUMMARY

Disclosed herein is a PMT suitable for detecting a photon, the PMT comprising: an electron ejector configured for emitting primary electrons in response to an incident photon; a detector configured for collecting electrons and providing an output signal representative of the incident photon; and a series of vertical electrodes between the electron ejector and the detector, wherein each of the vertical electrodes is configured for emitting secondary electrons in response to incident electrons, and each of the vertical electrodes is parallel to a straight line connecting the electron ejector and the detector.

According to an embodiment, the primary electrons emitted by the electron ejector are applied as incident electrons to first vertical electrode of the series; and the secondary electrons emitted by one vertical electrode are applied as incident electrons to next vertical electrode of the series, except that the secondary electrons emitted by last vertical electrode of the series are applied as incident electrons to the detector.

According to an embodiment, the series of vertical electrodes forms two columns of electrodes between the electron ejector and the detector, such that the primary and secondary electrons move between the two columns toward the detector.

According to an embodiment, the PMT comprises a transparent electrode bonded to the electron ejector and configured for applying a voltage to drive the primary electrons toward the detector.

According to an embodiment, the PMT comprises a series of horizontal electrodes between the electron ejector and the detector, wherein each of the horizontal electrodes is configured for applying a voltage to drive the secondary electrons toward the detector.

According to an embodiment, each of the vertical electrodes comprises MgO, alkali antimonide, alkali halide, BeO, GaP, GaAsP, PbO or $Cs_2O$.

According to an embodiment, the detector includes one or more electrodes and an amplifier electrically connected to the one or more electrodes.

According to an embodiment, the PMT has at least one of the following: a length of several microns to hundreds of microns; a width of several microns to hundreds of microns; and a height of several microns to hundreds of microns.

Disclosed herein is a method for making a PMT suitable for detecting a photon, the method comprising: etching a substrate to form a hole of the substrate and expose a series of vertical electrodes in the hole; bonding a detector to bottom of the hole; and bonding to top of the hole a cap wafer having a transparent electrode and an electron ejector, such that the series of vertical electrodes are between the electron ejector and the detector, wherein the electron ejector is configured for emitting primary electrons in response to an incident photon, each of the vertical electrodes is configured for emitting secondary electrons in response to incident electrons, each of the vertical electrodes is parallel to a straight line connecting the electron ejector and the detector, and the detector is configured for collecting electrons and providing an output signal representative of the incident photon.

According to an embodiment, the primary electrons emitted by the electron ejector are applied as incident electrons to first vertical electrode of the series; and the secondary electrons emitted by one vertical electrode are applied as incident electrons to next vertical electrode of the series, except that the secondary electrons emitted by last vertical electrode of the series are applied as incident electrons to the detector.

According to an embodiment, the series of vertical electrodes forms two columns of electrodes between the electron ejector and the detector, such that the primary and secondary electrons move between the two columns toward the detector.

According to an embodiment, the method further comprises bonding a transparent electrode to the electron ejector, wherein the transparent electrode is configured for applying a voltage to drive the primary electrons toward the detector.

According to an embodiment, the method further comprises forming a series of horizontal electrodes between the electron ejector and the detector, wherein each of the horizontal electrodes is configured for applying a voltage to drive the secondary electrons toward the detector.

According to an embodiment, the method further comprises electroplating a material (e.g., Mg or Be) on the vertical electrodes and oxidizing the material.

Disclosed herein is a PMT array suitable for detecting photons, comprising an array of PMTs each of which comprises: an electron ejector configured for emitting primary electrons in response to an incident photon; a detector configured for collecting electrons and providing an output signal representative of the incident photon; and a series of vertical electrodes between the electron ejector and the detector, wherein each of the vertical electrodes is configured for emitting secondary electrons in response to incident electrons, and each of the vertical electrodes is parallel to a straight line connecting the electron ejector and the detector.

According to an embodiment, the PMT array further comprises an imaging unit configured for generating an image based on spatial resolution of the photons detected by different PMTs in the array.

Disclosed herein is a PMT suitable for detecting a photon, the PMT comprising: an electron ejector configured for emitting primary electrons in response to an incident photon; a detector configured for collecting electrons and providing an output signal representative of the incident photon; and a series of electrodes between the electron ejector and the detector, wherein each of the electrodes is configured for emitting secondary electrons in response to incident electrons, and each of the electrodes includes a bi-metal arc-shaped sheet.

According to an embodiment, the primary electrons emitted by the electron ejector are applied as incident electrons to first electrode of the series; and the secondary electrons emitted by one electrode are applied as incident electrons to next electrode of the series, except that the secondary electrons emitted by last electrode of the series are applied as incident electrons to the detector.

According to an embodiment, at least one layer of the bi-metal arc-shaped sheet comprises MgO, alkali antimonide, alkali halide, BeO, GaP, GaAsP, PbO or $Cs_2O$.

According to an embodiment, the PMT has at least one of the following: a length of several microns to hundreds of microns; a width of several microns to hundreds of microns; and a height of several microns to hundreds of microns.

Disclosed herein is a method for making a PMT suitable for detecting a photon, the method comprising: forming a series of electrodes comprising a bi-metal sheet in a substrate; etching the substrate to form a hole in the substrate and expose the series of electrodes each of which is inside the hole; bonding a detector to bottom of the hole; bonding to top of the hole a cap wafer having a transparent electrode and an electron ejector, such that the series of electrodes are between the electron ejector and the detector; and wherein the electron ejector is configured for emitting primary electrons in response to an incident photon, each of the electrodes is configured for emitting secondary electrons in response to incident electrons, and the detector is configured for collecting electrons and providing an output signal representative of the incident photon.

According to an embodiment, the primary electrons emitted by the electron ejector are applied as incident electrons to first electrode of the series; and the secondary electrons emitted by one electrode are applied as incident electrons to next electrode of the series, except that the secondary electrons emitted by last electrode of the series are applied as incident electrons to the detector.

According to an embodiment, at least one layer of the bi-metal sheet comprises MgO, alkali antimonide, alkali halide, BeO, GaP, GaAsP, PbO or $Cs_2O$.

Disclosed herein is a PMT array suitable for detecting photons, comprising an array of PMTs each of which comprises: an electron ejector configured for emitting primary electrons in response to an incident photon; a detector configured for collecting electrons and providing an output signal representative of the incident photon; and a series of electrodes between the electron ejector and the detector, wherein each of the electrodes is configured for emitting secondary electrons in response to incident electrons, and each of the electrodes includes a bi-metal arc-shaped sheet.

According to an embodiment, the PMT array further comprises an imaging unit configured for generating an image based on spatial resolution of the photons detected by different PMTs in the array.

Disclosed herein is a night vision device suitable for producing an image viewable to a human eye, the night vision device comprising: the PMT described above, wherein the PMT is configured for detecting a photon from a dimly light source.

DETAILED DESCRIPTION

Figure 1:
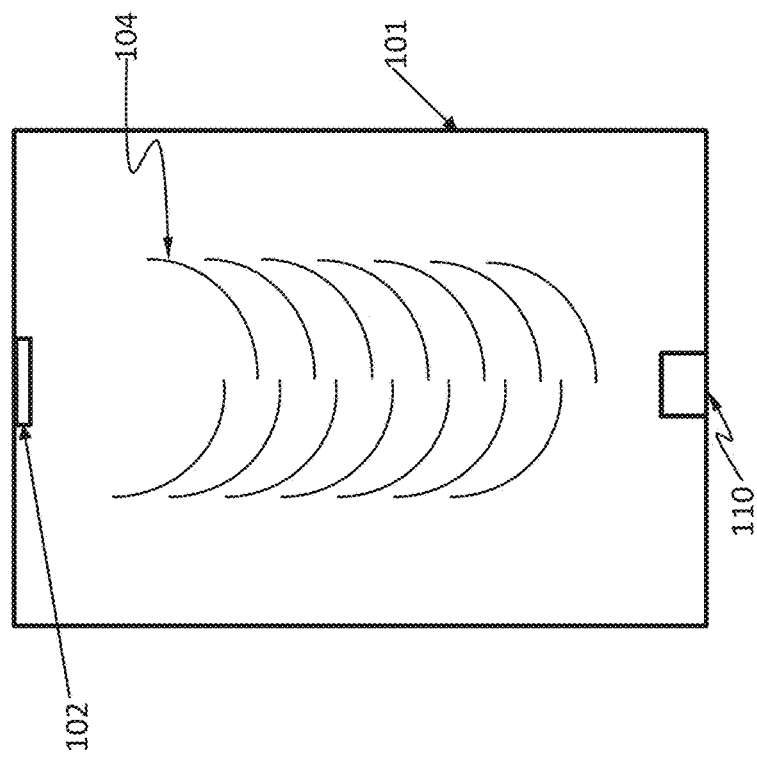
FIG. 1 schematically shows a cross-sectional view of a PMT, according to prior art.
Figure 2:
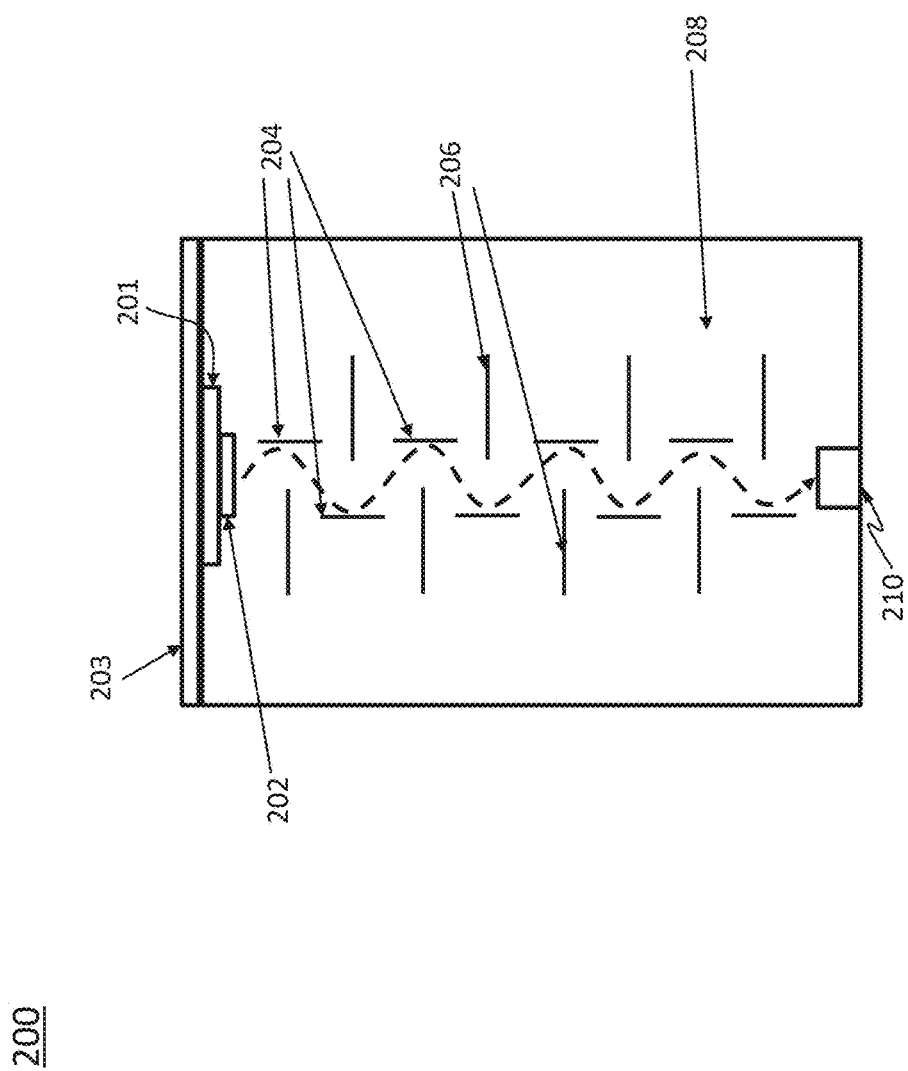
FIG. 2 schematically shows a cross-sectional view of an exemplary PMT including vertical electrodes, according to an embodiment of the present teaching.

FIG. 2 schematically shows a cross-sectional view of an exemplary PMT 200, according to an embodiment of the present teaching. As shown in FIG. 2, the PMT 200 may comprise a transparent electrode 201 supported on a cap wafer 203, an electron ejector 202 on the transparent electrode 201, a series of vertical electrodes 204, a series of horizontal electrodes 206, and a detector 210.

The transparent electrode 201 is transparent such that a light photon entering the PMT 200 may go through the transparent electrode 201 and incident on the electron ejector 202 that is bonded to the transparent electrode 201. The transparent electrode 201 here can establish an electric field to drive electrons emitted by the electron ejector 202 toward the detector 210.

The electron ejector 202 in this example is configured for emitting electrons in response to an incident photon, e.g. a light photon in the ultraviolet, visible, or near-infrared ranges of the electromagnetic spectrum. These electrons are called primary electrons and are directed by the transparent electrode 201 toward the series of vertical electrodes 204, where electrons are multiplied by the process of secondary emission. The electron ejector 202 may be very thin, e.g. having a thickness of several microns to hundreds of microns. The electron ejector 202 can be made by at least one of the materials: bialkali (such as Na—K—Sb), multialkali (such as Na—K—Sb—Cs), Ag—O—Cs, Sb—Cs, InGaAs, GaAs, Cs—Te, Cs—I, etc.

The series of vertical electrodes 204 and the series of horizontal electrodes 206 in this example are in a hole 208 between the electron ejector 202 and the detector 210. The primary electrons move toward the first vertical electrode because they are accelerated by the electric field. Upon striking the first vertical electrode, more low energy electrons are emitted, and these electrons are called secondary electrons and are in turn accelerated toward the second vertical electrode. As such, each of the vertical electrodes 204 is configured for emitting secondary electrons in response to incident electrons. The primary electrons emitted by the electron ejector 202 are applied as incident electrons to the first vertical electrode of the series. The secondary electrons emitted by one vertical electrode are applied as incident electrons to the next vertical electrode of the series, except that the secondary electrons emitted by the last vertical electrode of the series are applied as incident electrons to the detector 210.

In accordance with various embodiments, either the vertical electrodes or the horizontal electrodes or both can emit secondary electrons.

As shown in FIG. 2, each of the vertical electrodes 204 is vertical and parallel to a straight line connecting the electron ejector 202 and the detector 210. The series of vertical electrodes 204 forms two columns of electrodes between the n ejector 202 and the detector 210. The primary and secondary electrons move between the two columns toward the detector 210, along a path illustrated as the dashed line in FIG. 2.

In one embodiment, each vertical electrode is held at a more positive potential than the preceding vertical electrode in the series. A vertical electrode, that is closer to the detector 210 than a different vertical electrode, has a more positive potential than that different vertical electrode.

In one embodiment, each of the vertical electrodes 204 includes MgO, alkali antimonide, alkali halide, BeO, GaP, GaAsP, PbO or $Cs_2O$ or another material to lower the work function of the surface of the vertical electrode, such that secondary electrons can be emitted more easily. In one embodiment, about 1000 electrons can be collected by the detector 210 from each incident photon, which is sufficient for the detector 210 to determine an existence of incident photons.

Each of the horizontal electrodes 206 is configured for applying a voltage to drive the secondary electrons toward the detector 210. In one embodiment, each horizontal electrode is held at a more positive potential than the preceding horizontal electrode in the series. A horizontal electrode, that is closer to the detector 210 than a different horizontal electrode, has a more positive potential than the different horizontal electrode.

The vertical electrodes 204 and the horizontal electrodes 206 can be made with a microfabrication technology such as CMOS (complementary metal-oxide semiconductor) technology. For example, electrode wires can be put in a silicon oxide substrate. Then, the substrate can be etched with HF (hydrofluoric acid) to remove the silicon oxide to expose the electrode wires. A material promoting secondary electron emission (e.g., MgO, alkali antimonide, alkali halide, BeO, GaP, GaAsP, PbO or $Cs_2O$) may be put on the wire by a suitable technique (e.g., electroplating and oxidizing, CVD, evaporation, etc.). The vertical electrodes 204 and the horizontal electrodes 206 can be made into micron level. Accordingly, the PMT 200 can be made into micro level as well. The size of the PMT 200 (e.g. the length, the width, or the height of the PMT 200) may be of several microns to hundreds of microns. This micro PMT can provide a high sensitivity and a high spatial resolution when being used in a PMT array. In an embodiment, the vertical electrode 204 may be made by electroplating, for example, onto a vertical mesh, a series of closely spaced vertical lines or a series of closely spaced horizontal lines.

The detector 210 in this example includes one or more electron collectors and an amplifier electrically connected to the one or more electron collectors. Each electron collector is configured for collecting the secondary electrons. The amplifier is configured for providing an output signal representative of the incident photon. In one example, the output signal may indicate a voltage change that can be used to determine an existence of an incident photon. The detector 210 may be formed at the bottom of the hole 208. It can be understood that, instead of including an amplifier, the detector 210 may include an oscillator for providing an output signal representative of the incident photon. In contrast to an amplifier that generates a voltage change, an oscillator can generate a frequency change to detect an incoming signal.

According to an embodiment of the present teaching, the PMT 200 may be fabricated with one or more wafers. The wafer with holes 208 can be either the same as the wafer including the detector 210, or a different wafer than the wafer including the detector 210. Each wafer can be made of silicon, glass, silicon oxide or other materials.

The wafer with hole has electrodes inside. One way to grow the wafer with electrodes inside is by standard CMOS metal in oxide technology, where many layers of metal wires can be fabricated on top of the silicon wafer, inside passivation mostly with silicon oxide, for interconnections. Pt or Au, which does not react with HF, may be used to form patterns (including the horizontal and vertical electrodes) inside the $SiO_2$ according to the structure of the PMT. Then, HF can be used to etch off $SiO_2$ and leave the electrodes (Pt or Au) exposed.

Figure 3:
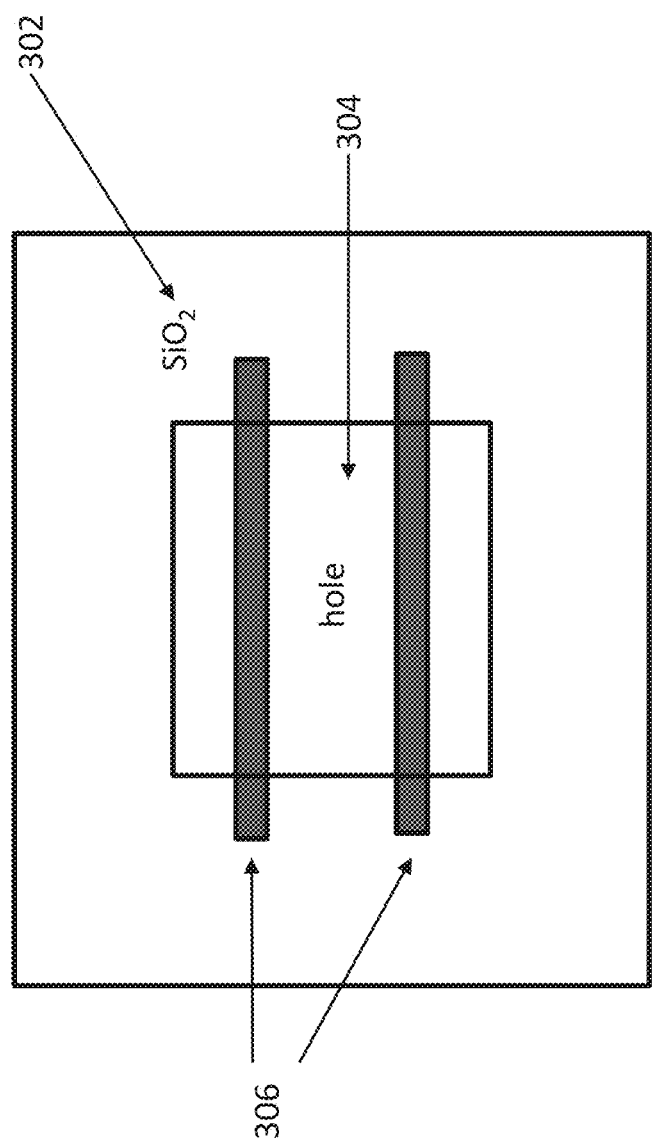
FIG. 3 shows a top view of an exemplary PMT during fabrication, according to an embodiment of the present teaching.

FIG. 3 shows a top view of an exemplary PMT during fabrication, according to an embodiment of the present teaching. As shown in FIG. 3, after etching $SiO_2$ 302 with HF to form the hole 304, the metals or electrodes 306 are left. In one embodiment, after the hole is dug, the MgO can be coated on the surface of the electrodes. Then, the hole may be sealed by another wafer (e.g. a glass wafer) together with Indium Tin Oxide (ITO) deposition and photocathodes as the electron ejectors.

According to an embodiment of the present teaching, the PMT 200 may be fabricated using a method including: etching a substrate to form a hole of the substrate and expose a series of vertical electrodes in the hole; coating the electrodes with a suitable material such MgO, alkali antimonide, alkali halide, BeO, GaP, GaAsP, PbO or $Cs_2O$; bonding a detector to bottom of the hole; and bonding an electron ejector to top of the hole, such that the series of vertical electrodes are between the electron ejector and the detector, wherein the electron ejector is configured for emitting primary electrons in response to an incident photon, each of the vertical electrodes is configured for emitting secondary electrons in response to incident electrons, each of the vertical electrodes is parallel to a straight line connecting the electron ejector and the detector, and the detector is configured for collecting electrons and providing an output signal representative of the incident photon.

Figure 9A:
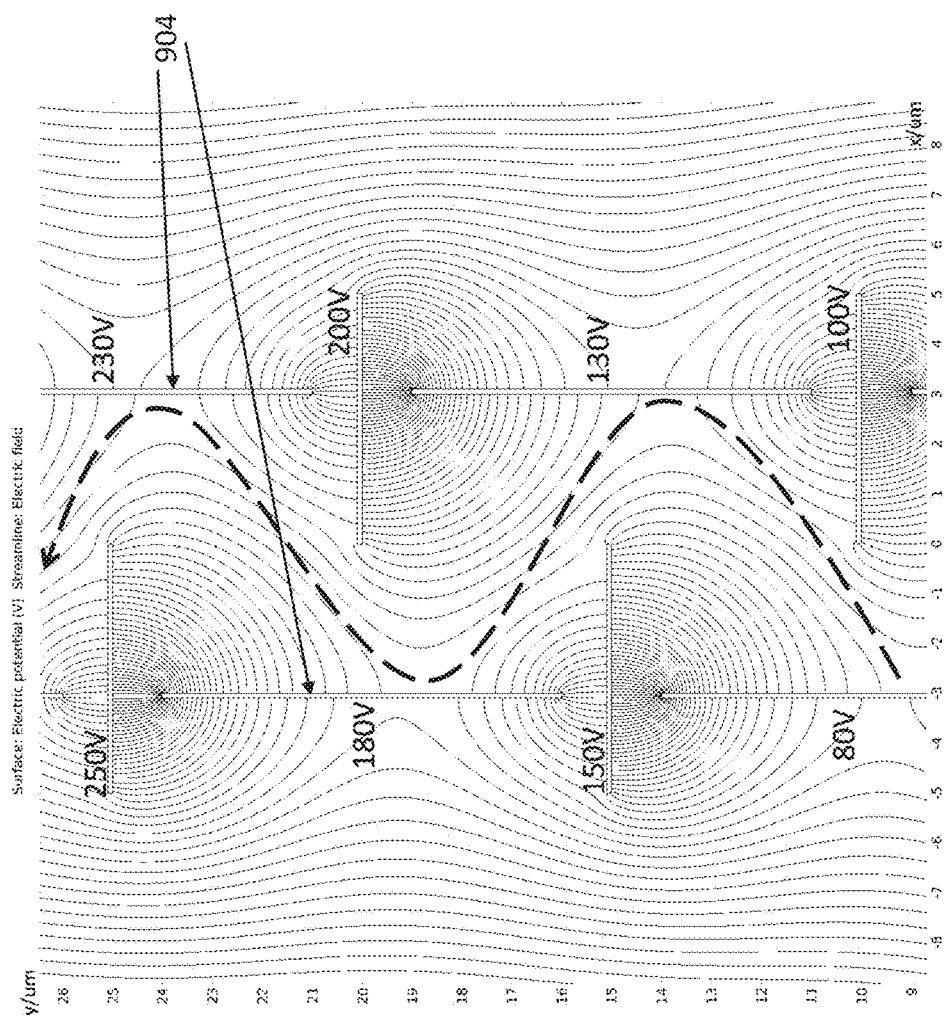
FIG. 9A shows a snapshot of the electric field of an exemplary PMT, according to an embodiment of the present teaching.

FIG. 9A shows a snapshot of the electric field of an exemplary PMT, according to an embodiment of the present teaching. The exemplary PMT may be the PMT 200 shown in FIG. 2. FIG. 9A is a simulation result performed with software "comsol multiphysics." As shown in FIG. 9A, the voltages of the metal stripes (i.e. vertical and horizontal electrodes) are labeled. The electric field of the PMT is represented by the streamlines. As illustrated in FIG. 9A, the electrons would move between the two columns of vertical electrodes 904, along a path illustrated as the dashed line in FIG. 9A.

Figure 9B:
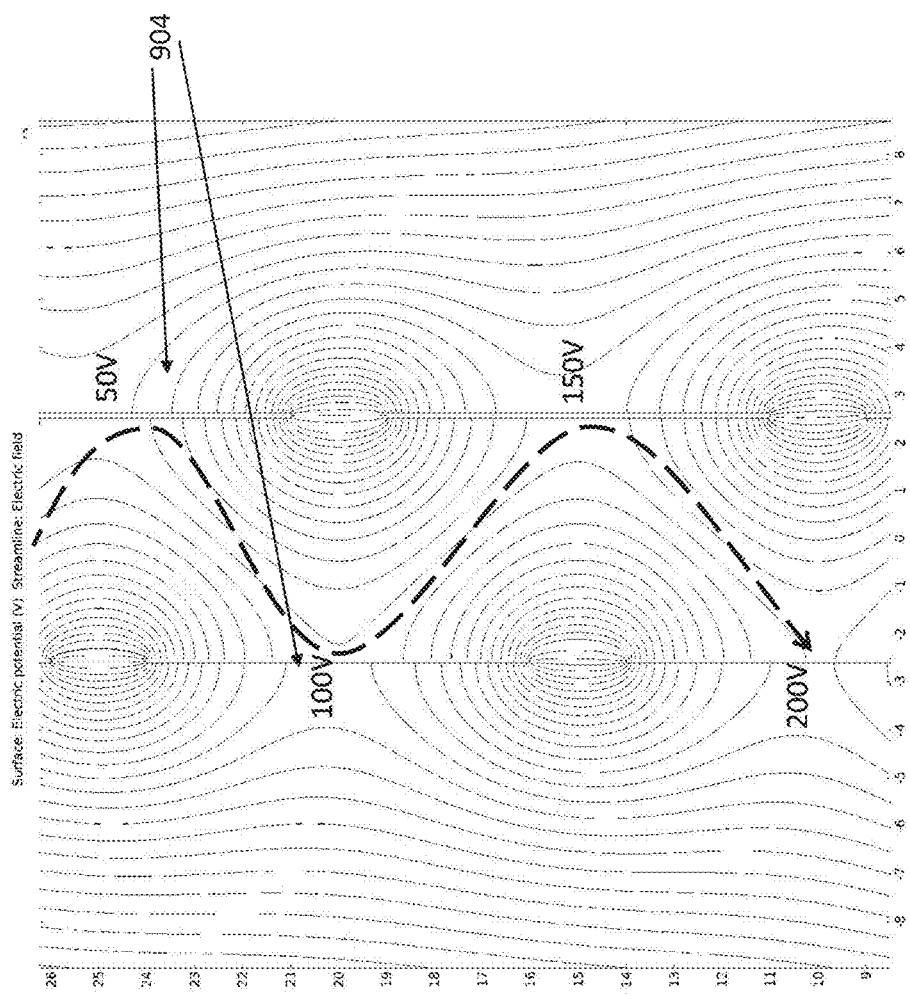
FIG. 9B shows a snapshot of the electric field of an exemplary PMT, according to an embodiment of the present teaching.

FIG. 9B shows a snapshot of the electric field of an exemplary PMT, according to an embodiment of the present teaching. The exemplary PMT is similar to the PMT 200 shown in FIG. 2, except that the horizontal electrodes 206 are omitted. FIG. 9B is a simulation result performed with software "comsol multiphysics." As shown in FIG. 9B, the voltages of the vertical electrodes are labeled. The electric field of the PMT is represented by the streamlines. As illustrated in FIG. 9B, the electrons would move between the two columns of vertical electrodes 904, along a path illustrated as the dashed line in FIG. 9B.

Figure 4:
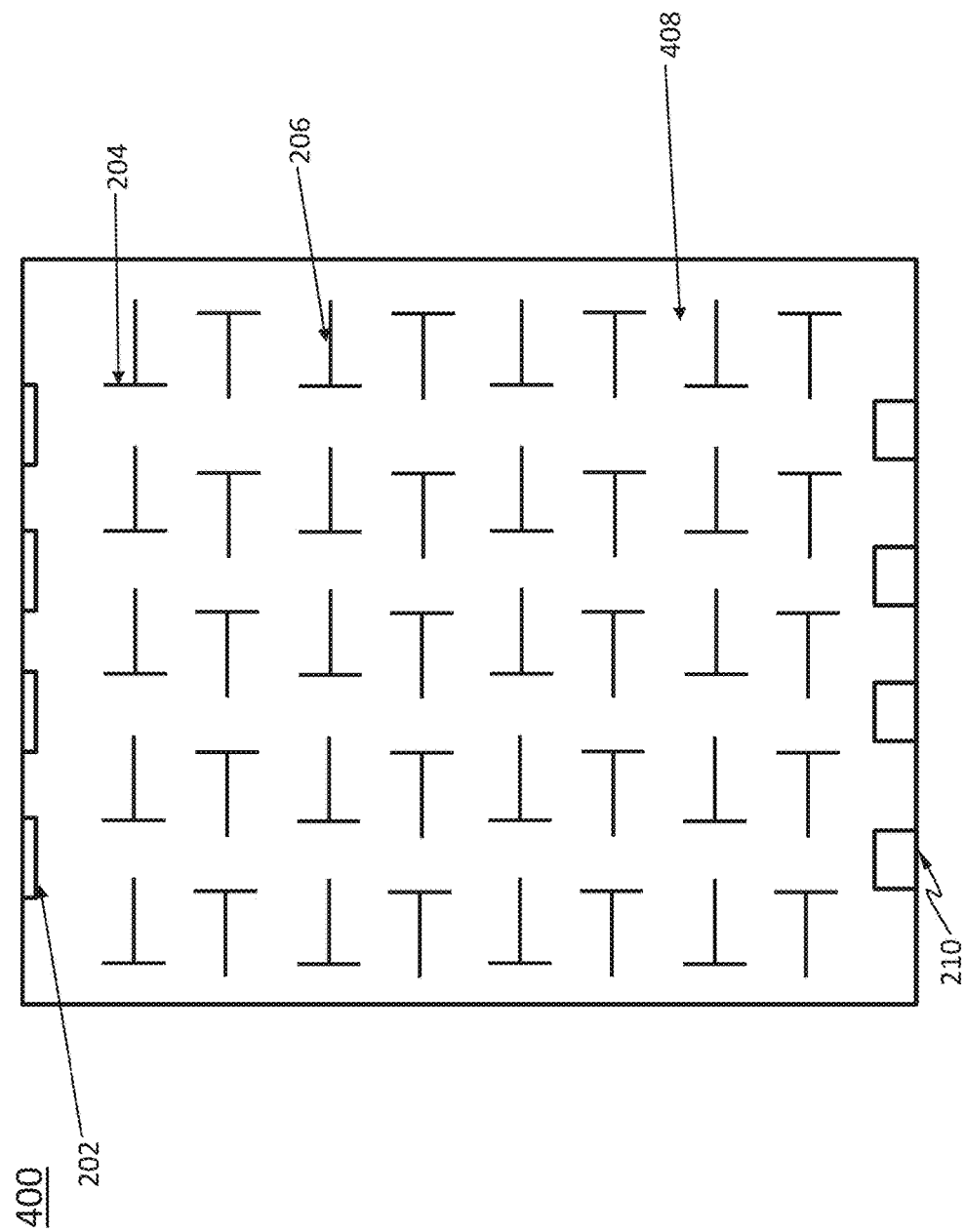
FIG. 4 schematically shows a cross-sectional view of an exemplary PMT array, according to an embodiment of the present teaching.

When a plurality of the PMTs 200 forms an array, a spatial distribution (e.g., an image) of incident light intensity may be determined by individually measuring the voltage change at an amplifier of each PMT of the array. FIG. 4 schematically shows a cross-sectional view of an exemplary PMT array 400, according to an embodiment of the present teaching, wherein like numbers reference like elements as in previous figures. As shown in FIG. 4, the PMT array 400 comprises an array of PMTs and each PMT may comprise the electron ejector 202, the series of vertical electrodes 204, the series of horizontal electrodes 206, and the detector 210.

The series of vertical electrodes 204 and the series of horizontal electrodes 206 of all PMTs in the PMT array 400 are in a same hole 408 between the electron ejectors 202 and the detectors 210. In one embodiment, each PMT in the PMT array 400 can work independently to determine an existence of an incident photon on that PMT.

According to one embodiment, the PMT array further comprises an imaging unit (not shown) electrically connected to all of the detectors 210 and configured for generating an image based on spatial resolution of the photons detected by the different PMTs in the array. For example, the imaging unit can generate an image by counting the numbers of incident photons on each PMT in the array during a period of time.

Figure 5:
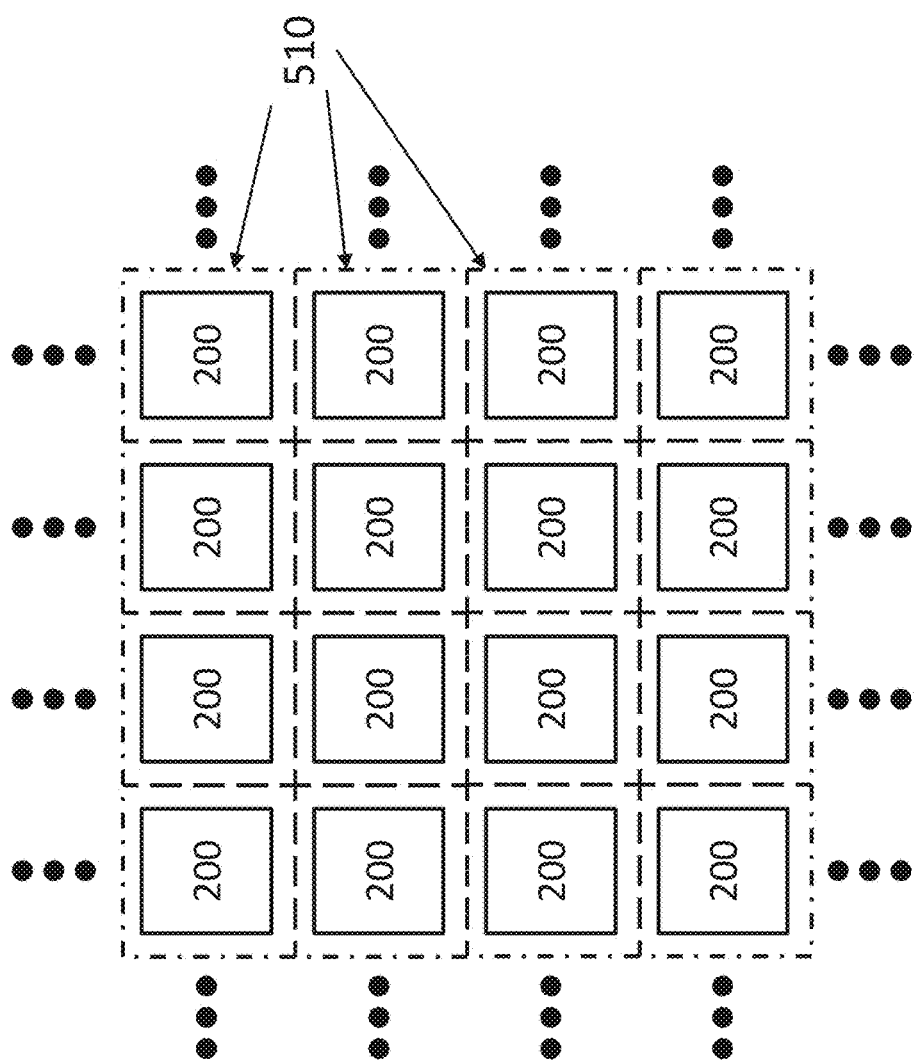
FIG. 5 shows a top view of a portion of an exemplary PMT array, according to an embodiment of the present teaching.

FIG. 5 shows a top view of a portion of an exemplary PMT array, according to an embodiment of the present teaching. The exemplary PMT array may be the PMT array 400 in FIG. 4. Electrons generated by a photon incident around the footprint of one of the PMTs 200 are not substantially shared with another of the PMTs 200. The area 510 around a PMT 200 in which substantially all (more than 95%, more than 98% or more than 99% of) electrons generated by a photon incident therein are detected by the PMT 200 is called a pixel associated with that PMT 200.

For example, by measuring the voltage change at the detector of each of the PMTs 200, the number of incident photons (which relates to the incident light intensity) for that PMT may be determined. Thus, the spatial distribution (e.g., an image) of incident light intensity may be determined by individually measuring the voltage change at pixel of the array.

The pixels may be organized in any suitable array, such as, a square array, a triangular array and a honeycomb array. The pixels may have any suitable shape, such as, circular, triangular, square, rectangular, and hexangular. The pixels may be individually addressable.

Figure 6:
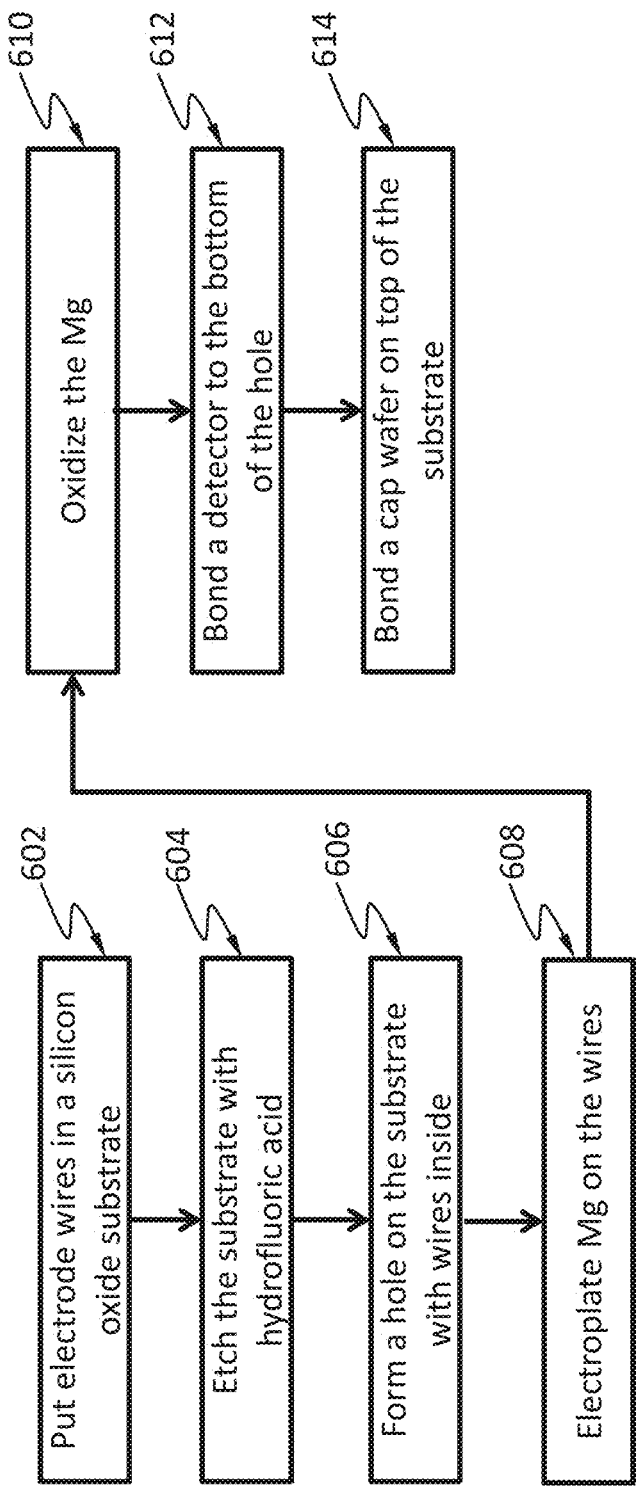
FIG. 6 shows an exemplary method of making a PMT, according to an embodiment of the present teaching.

FIG. 6 shows an exemplary method of making a PMT, according to an embodiment of the present teaching. In one embodiment, the PMT is the PMT 200 shown in FIG. 2. At 602, electrode wires are put into a silicon oxide substrate, e.g. in form of a wafer. The electrode wires may include vertical wires and horizontal wires arranged as shown in FIG. 2 and FIG. 3. Then at 604, the substrate is etched, e.g. with HF, to remove the silicon oxide and expose the electrode wires. At 606, a hole is formed on the substrate, e.g. by etching more to remove the silicon oxide. The electrode wires are inside the hole. At 608, a material precursor such as Mg is electroplated onto the electrode wires. At 610, the material precursor is converted to form a material that promote secondary electron emission (e.g., Mg is oxidized to become MgO).

At 612, a detector is bonded to the bottom of the hole. The detector can be fabricated on another wafer, and then bonded together to the wafer of the hole. At 614, a cap wafer with a transparent electrode and an electron ejector supported thereon is bonded to the substrate, on top of the hole. It can be understood that the method in FIG. 6 can be performed on a wafer level to form a PMT array described herein.

According to one embodiment, the holes and the detectors can be fabricated on the same wafer. The surface of the detector may be made of Au or PT as well, which also stops the etching of HF. In one pixel, there might be one or many detectors.

Figure 7:
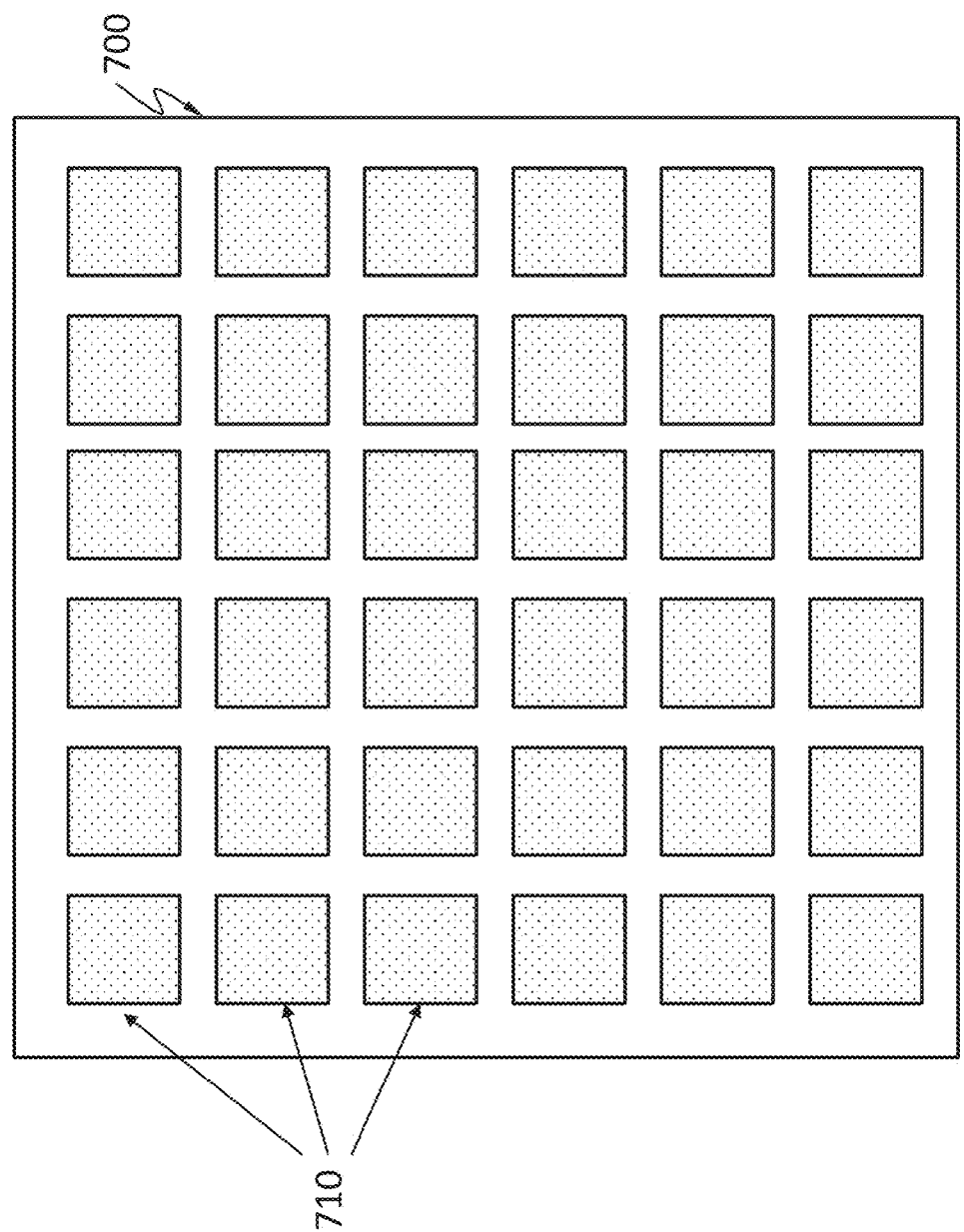
FIG. 7 shows a top view of an exemplary pixel including multiple detectors, according to an embodiment of the present teaching.

FIG. 7 shows a top view of an exemplary pixel including multiple detectors, according to an embodiment of the present teaching. In the pixel 700 shown in FIG. 7, the detectors can be floating gates of many transistors within an oscillator loop, such that the change of the charges will alter the oscillating frequency. The metal pads 710 of the detector may cover most of the area of the bottom of the hole, to stop the etching of HF and serve as electrodes after etch stops.

Figure 8:
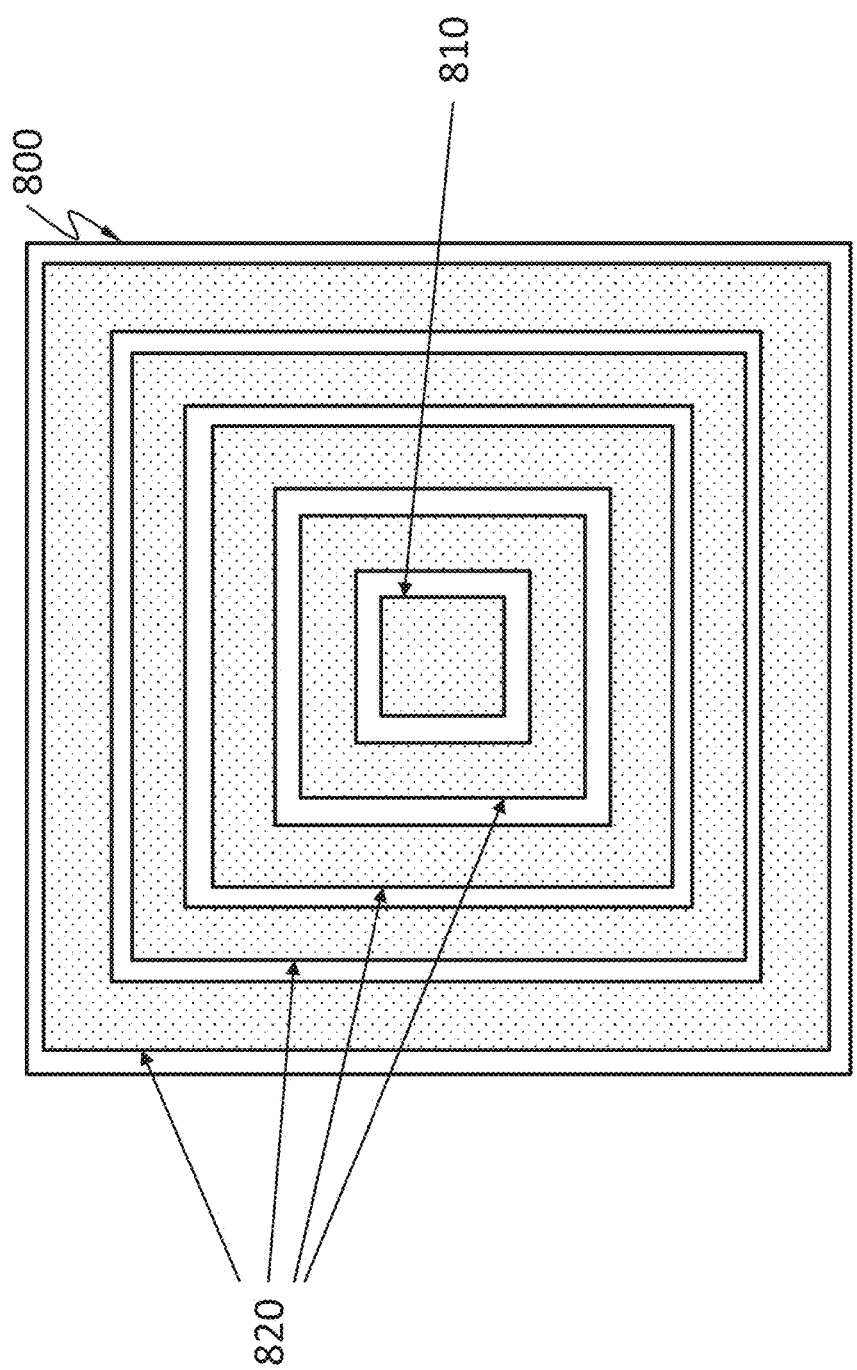
FIG. 8 shows a top view of another exemplary pixel including a detector surrounded by many rings, according to an embodiment of the present teaching.

According to one embodiment, only one detector is within one pixel. Then, the metal pad of the detector can be surrounded by many rings. FIG. 8 shows a top view of another exemplary pixel 800 including a detector surrounded by many rings 820, according to an embodiment of the present teaching. The rings 820 can be biased to focus the electrons onto the central metal pad 810, which is the electrode of the detector. The rings may also be made of Pt or Au, with tiny little gaps in between, to stop etching.

The materials above and below the metal layer can be different. For example, $SiO_2$ is above the metal layer and SiNx is below the metal layer, such that the etching can be faster in $SiO_2$.

Figure 10:
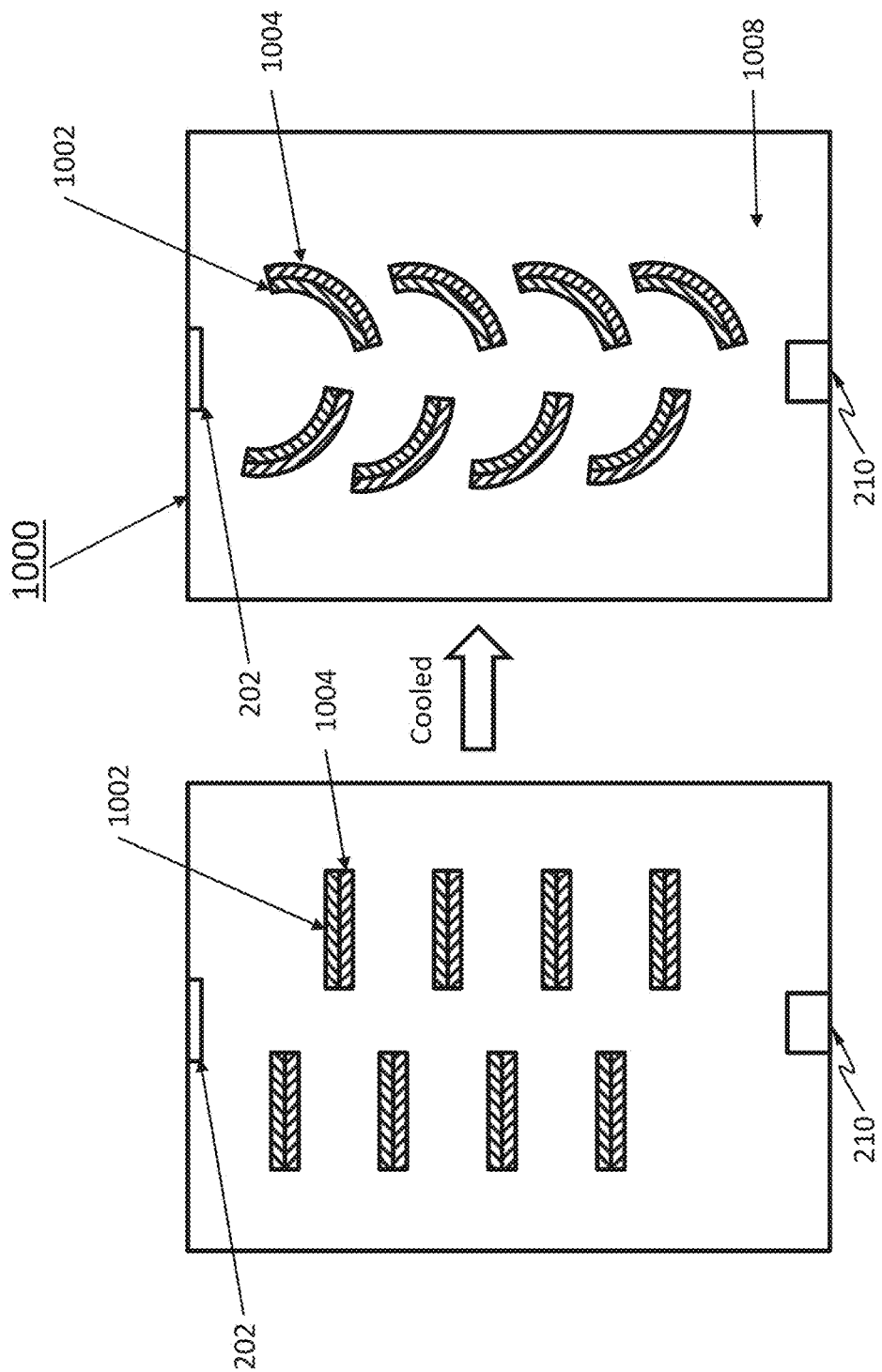
FIG. 10 schematically shows a cross-sectional view of another exemplary PMT including bi-metal sheets, according to an embodiment of the present teaching.

FIG. 10 schematically shows a cross-sectional view of another exemplary PMT 1000 including bi-metal sheets, according to an embodiment of the present teaching, wherein like numbers reference like elements as in previous figures. As shown in FIG. 10, the PMT 1000 may comprise the electron ejector 202, a series of electrodes each of which includes a bi-metal sheet, and a detector 210. The bi-metal sheet is composed of two separate metals joined together, e.g. two layers of different metals. As shown in FIG. 10, during the fabrication of the PMT 1000, the bi-metal sheet may be flat, including a first metal 1002 and a second metal 1004. The first metal 1002 and the second metal 1004 have suitable different thermal expansion coefficients, such that when at the operating temperature of the PMT, the bi-metal sheet may bend to have an arc shape as shown in FIG. 10. That is, the operating temperature for the PMT 1000 is lower than the deposition temperature or fabrication temperature of the PMT 1000.

In one embodiment, the operating temperature for the PMT 1000 is higher than the deposition temperature or fabrication temperature of the PMT 1000. The metals 1002 and 1004 can be chosen to have different thermal expansion coefficients to make the bi-metal sheet bend toward a suitable direction after the PMT 1000 is heated after fabrication.

The series of bi-metal sheets 1002, 1004 in this example are in a hole 1008 between the electron ejector 202 and the detector 210. During operation, the bi-metal sheets 1002, 1004 are arc-shaped. The electron ejector 202 is configured for emitting primary electrons in response to an incident photon. The primary electrons move toward the first bi-metal arc-shaped sheet of the series. Upon striking the first bi-metal sheet, more low energy electrons are emitted, and these electrons are called secondary electrons and are in turn accelerated toward the second bi-metal arc-shaped sheet. As such, each of the bi-metal arc-shaped sheets 1002, 1004 is configured for emitting secondary electrons in response to incident electrons. The primary electrons emitted by the electron ejector 202 are applied as incident electrons to the first bi-metal arc-shaped sheet of the series. The secondary electrons emitted by one bi-metal arc-shaped sheet are applied as incident electrons to the next bi-metal arc-shaped sheet of the series, except that the secondary electrons emitted by the last bi-metal arc-shaped sheet of the series are applied as incident electrons to the detector 210.

In one embodiment, each bi-metal arc-shaped sheet is held at a more positive potential than the preceding bi-metal arc-shaped sheet in the series. A bi-metal arc-shaped sheet, that is closer to the detector 210 than a different bi-metal arc-shaped sheet, has a more positive potential than the different bi-metal arc-shaped sheet.

In one embodiment, the bi-metal sheet includes MgO, alkali antimonide, alkali halide, BeO, GaP, GaAsP, PbO or $Cs_2O$ or another material to lower the work function of the surface of the bi-metal sheet, such that secondary electrons can be emitted more easily. For example, the upper layer 1002 of each bi-metal sheet in the PMT 1000 may include MgO to have a low work function.

The bi-metal sheets can be made into micron level. Accordingly, the PMT 1000 can be made into micro level as well. The size of the PMT 1000 (e.g. the length, the width, or the height of the PMT 1000) may be of several microns to hundreds of microns. This micro PMT can provide a high sensitivity and a high spatial resolution when being used in a PMT array.

The detector 210 in this example includes one or more electron collectors and an amplifier electrically connected to the one or more electron collectors. Each electron collector is configured for collecting the secondary electrons. The amplifier is configured for providing an output signal representative of the incident photon. In one example, the output signal may indicate a voltage change that can be used to determine an existence of an incident photon. The detector 210 may be formed at the bottom of the hole 1008. It can be understood that, instead of including an amplifier, the detector 210 may include an oscillator for providing an output signal representative of the incident photon. In contrast to an amplifier that generates a voltage change, an oscillator can generate a frequency change to detect an incoming signal.

According to an embodiment of the present teaching, the PMT 1000 may be fabricated using a method including: forming a series of electrodes comprising a bi-metal sheet in a substrate; etching the substrate to form a hole in the substrate and expose the series of electrodes each of which is inside the hole; bonding a detector to bottom of the hole; bonding to top of the hole a cap wafer having a transparent electrode and an electron ejector, such that the series of vertical electrodes are between the electron ejector and the detector; and wherein the electron ejector is configured for emitting primary electrons in response to an incident photon, each of the electrodes is configured for emitting secondary electrons in response to incident electrons, and the detector is configured for collecting electrons and providing an output signal representative of the incident photon.

In one embodiment, the PMT 1000 also comprises a transparent electrode (not shown in FIG. 10) bonded to the electron ejector 202. The transparent electrode is transparent such that a light photon entering the PMT 1000 may go through the transparent electrode and incident on the electron ejector 202. The transparent electrode can establish an electric field to drive electrons emitted by the electron ejector 202 toward the detector 210.

Figure 11:
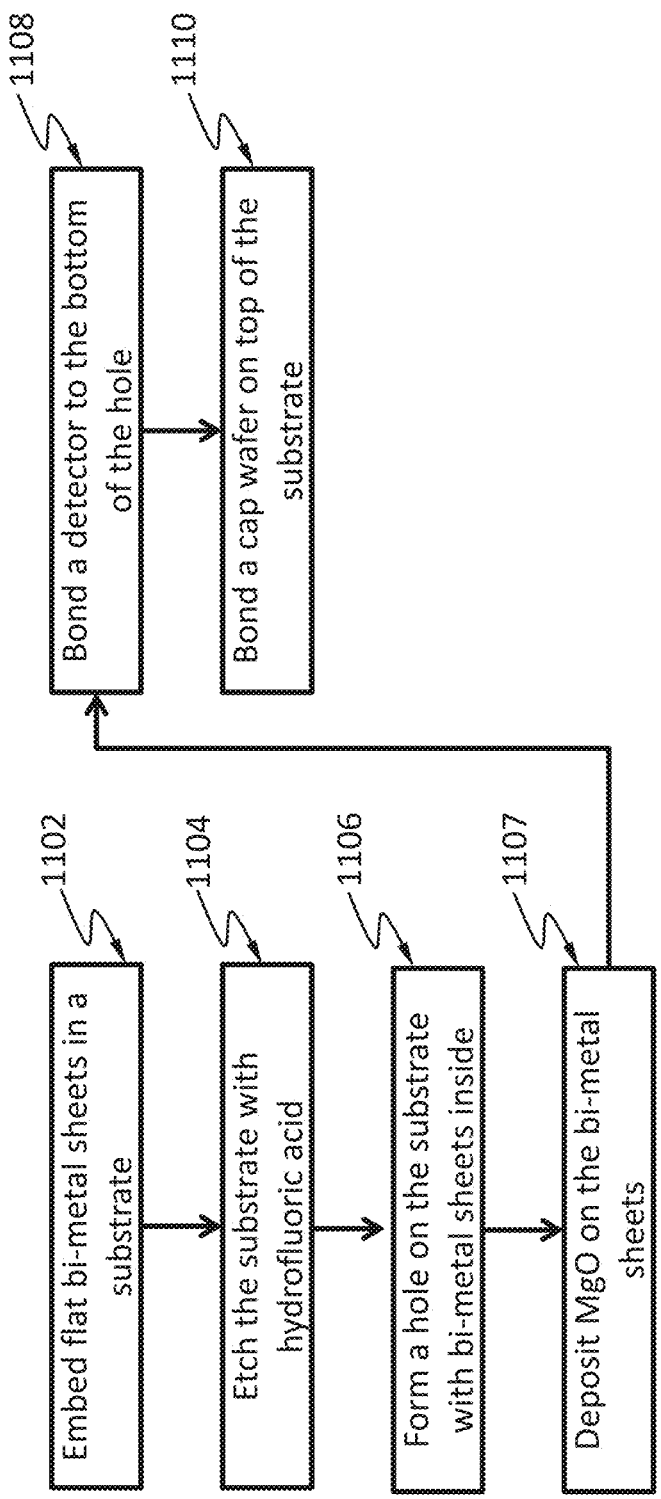
FIG. 11 shows another exemplary method of making a PMT, according to an embodiment of the present teaching.

FIG. 11 shows another exemplary method of making a PMT, according to an embodiment of the present teaching. In one embodiment, the PMT is the PMT 1000 shown in FIG. 10. At 1102, bi-metal sheets are formed or embedded in a substrate. The bi-metal sheets may be flat at the fabrication temperature, as shown in FIG. 10. The substrate may include silicon oxide. Then at 1104, the substrate is etched, e.g. with HF, to remove the silicon oxide and expose the bi-metal sheets. At 1106, a hole is formed on the substrate, e.g. by etching more to remove the silicon oxide. The bi-metal sheets are inside the hole. In one embodiment, the method in FIG. 11 may also include a step 1107 in which MgO (or alkali antimonide, alkali halide, BeO, GaP, GaAsP, PbO or $Cs_2O$) is deposited onto each bi-metal sheet, e.g. by electroplating Mg onto the upper layer of each bi-metal sheet and oxidizing the Mg to form MgO or any other suitable technique. The upper layer is the layer first receiving the incident electrons in the bi-metal sheet.

At 1108, a detector is bonded to the bottom of the hole. The detector can be fabricated on another wafer, and then bonded together to the wafer of the hole. At 1110, a cap wafer with a transparent electrode and an electron ejector supported thereon is bonded to the substrate, on top of the hole.

It can be understood that the method in FIG. 11 can be performed on a wafer level to form an array of PMTs 1000.

Figure 12A:
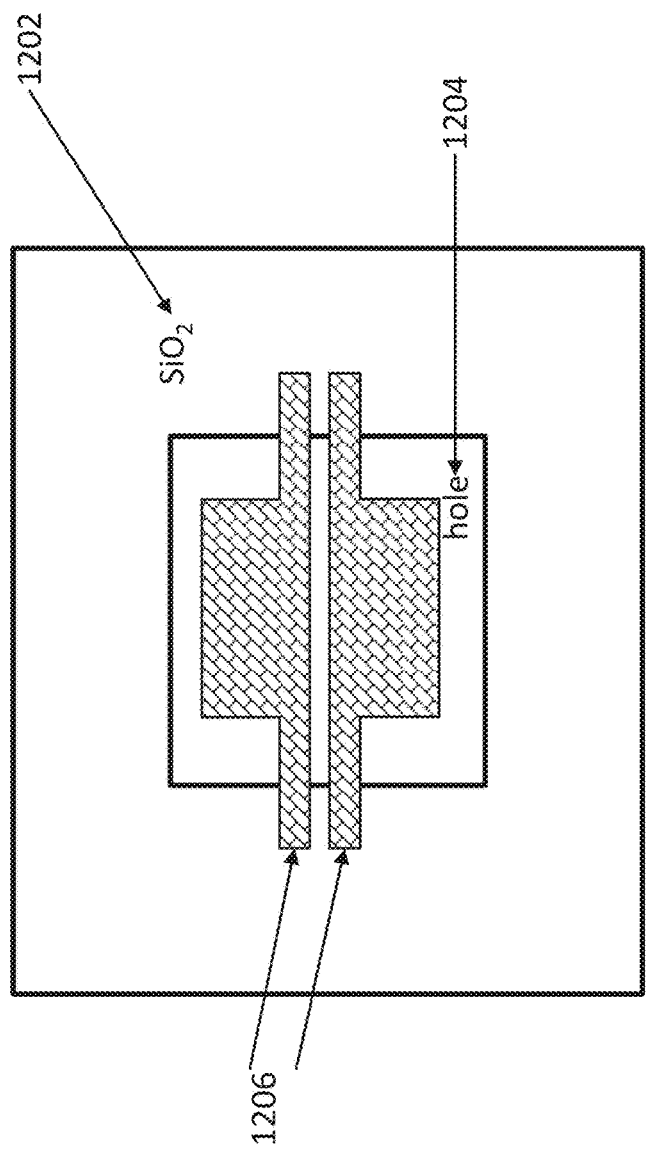
FIG. 12A shows a top view of another exemplary PMT during fabrication, according to an embodiment of the present teaching.
Figure 12B:
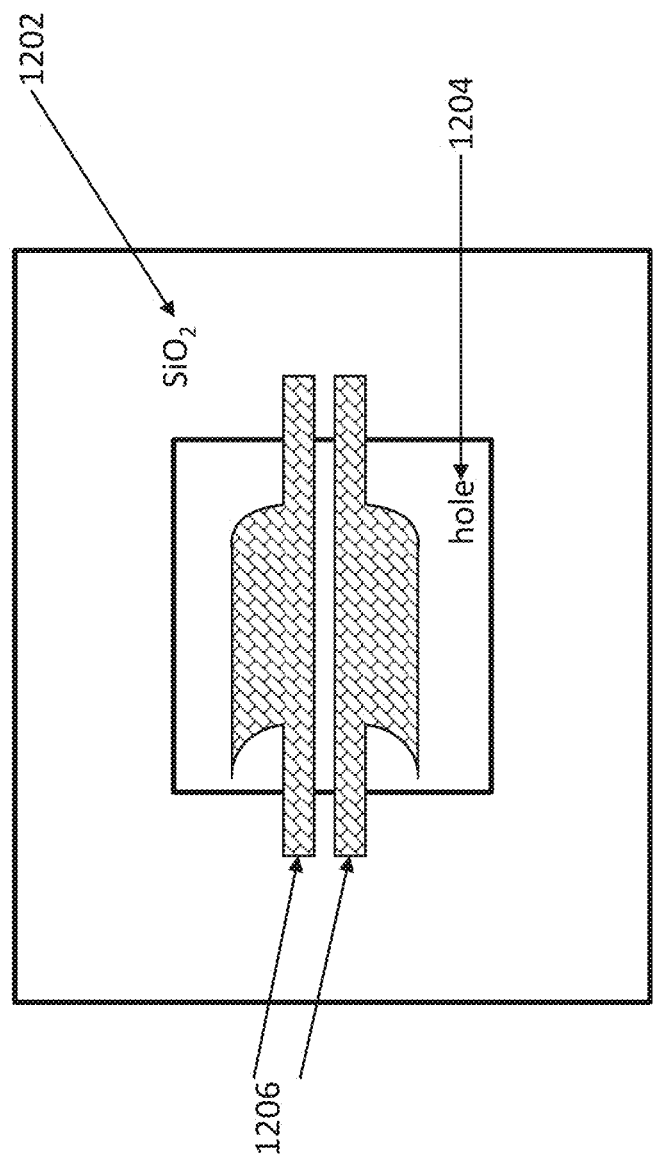
FIG. 12B shows a top view of the PMT of FIG. 12A during operation, according to an embodiment of the present teaching.

FIG. 12A shows a top view of another exemplary PMT during fabrication, according to an embodiment of the present teaching. In one embodiment, the PMT is the PMT 1000 shown in FIG. 10. As shown in FIG. 12A, after etching SiO₂ 1202 with HF to form the hole 1204, the metals or electrodes 1206 are left. FIG. 12B shows a top view of the PMT of FIG. 12A during operation, where the bi-metal sheet 1206 bends into an arc shape.

Figure 13:
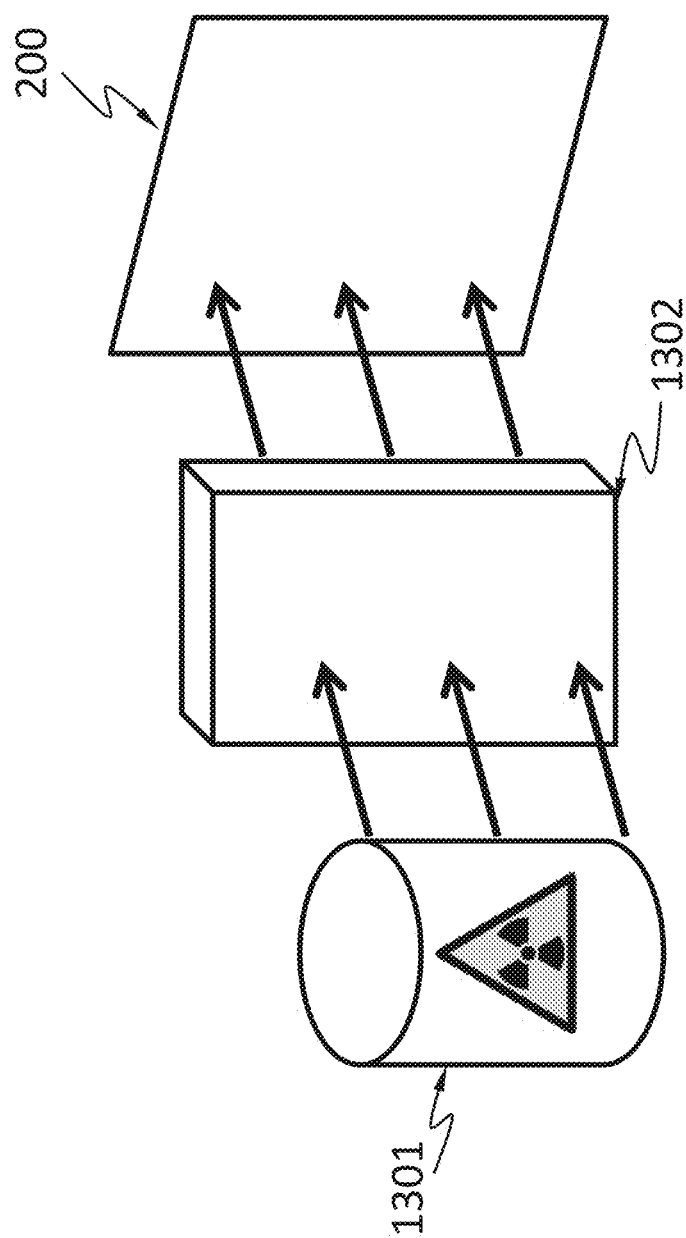
FIG. 13 schematically shows a system comprising the PMT described herein, suitable for detecting ionizing radiation, according to an embodiment of the present teaching.

FIG. 13 schematically shows a system comprising the PMT described herein, according to an embodiment of the present teaching. The system may be used for detecting ionizing radiation from a source 1301. The system comprises a scintillator 1302 and the PMT 200 described herein. The scintillator 1302 may absorb Gamma rays, X-rays, and the higher ultraviolet part of the electromagnetic spectrum that are radiated from the source 1301, and emit visible light, which can then be detected by the PMT 200. The scintillator 1302 may include sodium iodide. It can be understood that the PMT 200 in this system may be replaced by the PMT 1000 or the PMT array 400 as disclosed herein.

Figure 14:
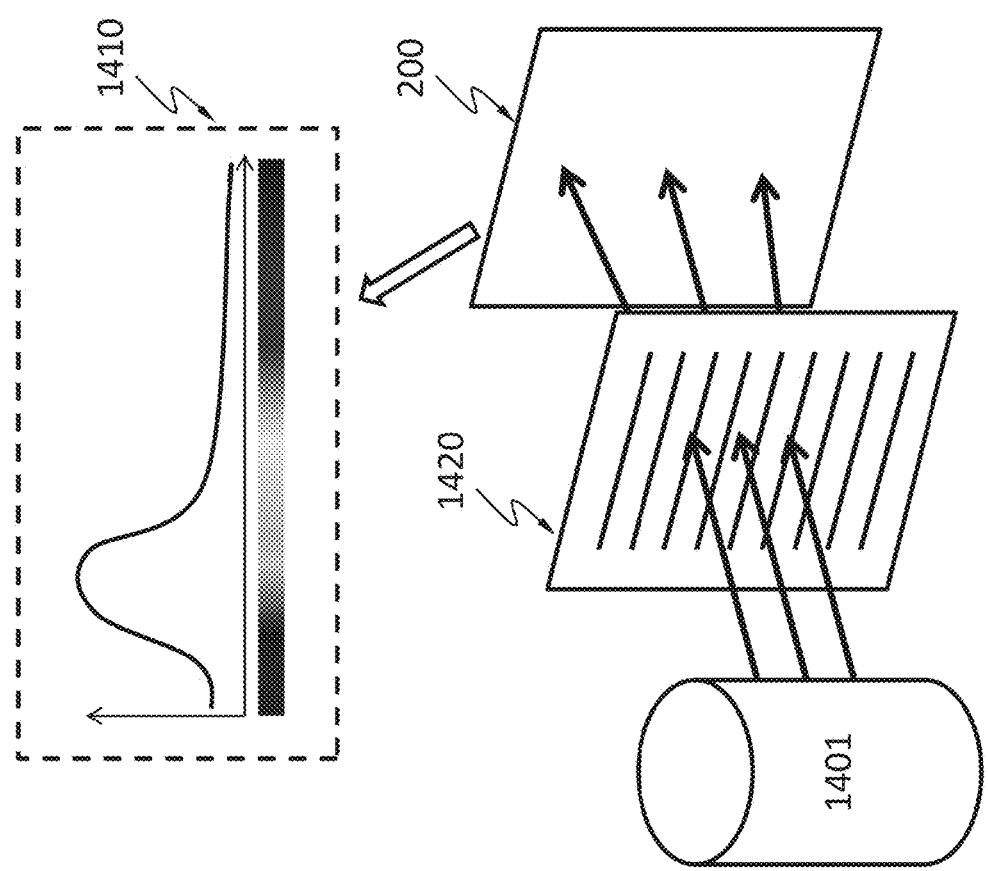
FIG. 14 schematically shows a system comprising the PMT described herein, suitable for measuring the intensity and spectrum of a light-emitting material, according to an embodiment of the present teaching.

FIG. 14 schematically shows a system comprising the PMT 200 described herein, according to an embodiment of the present teaching. The system may be used for measuring the intensity and spectrum of a light-emitting material 1401. The light-emitting material 1401 may be a compound semiconductor or a quantum dot that emits light. With the PMT 200 described herein, the system in FIG. 14 may measure the spectrum 1410 of the light emitted by the light-emitting material 1401 by spreading the light with a prism or diffraction grating 1420 and detecting the light with the PMT 200. It can be understood that the PMT 200 in this system may be replaced by the PMT 1000 or the PMT array 400 as disclosed herein.

Figure 15:
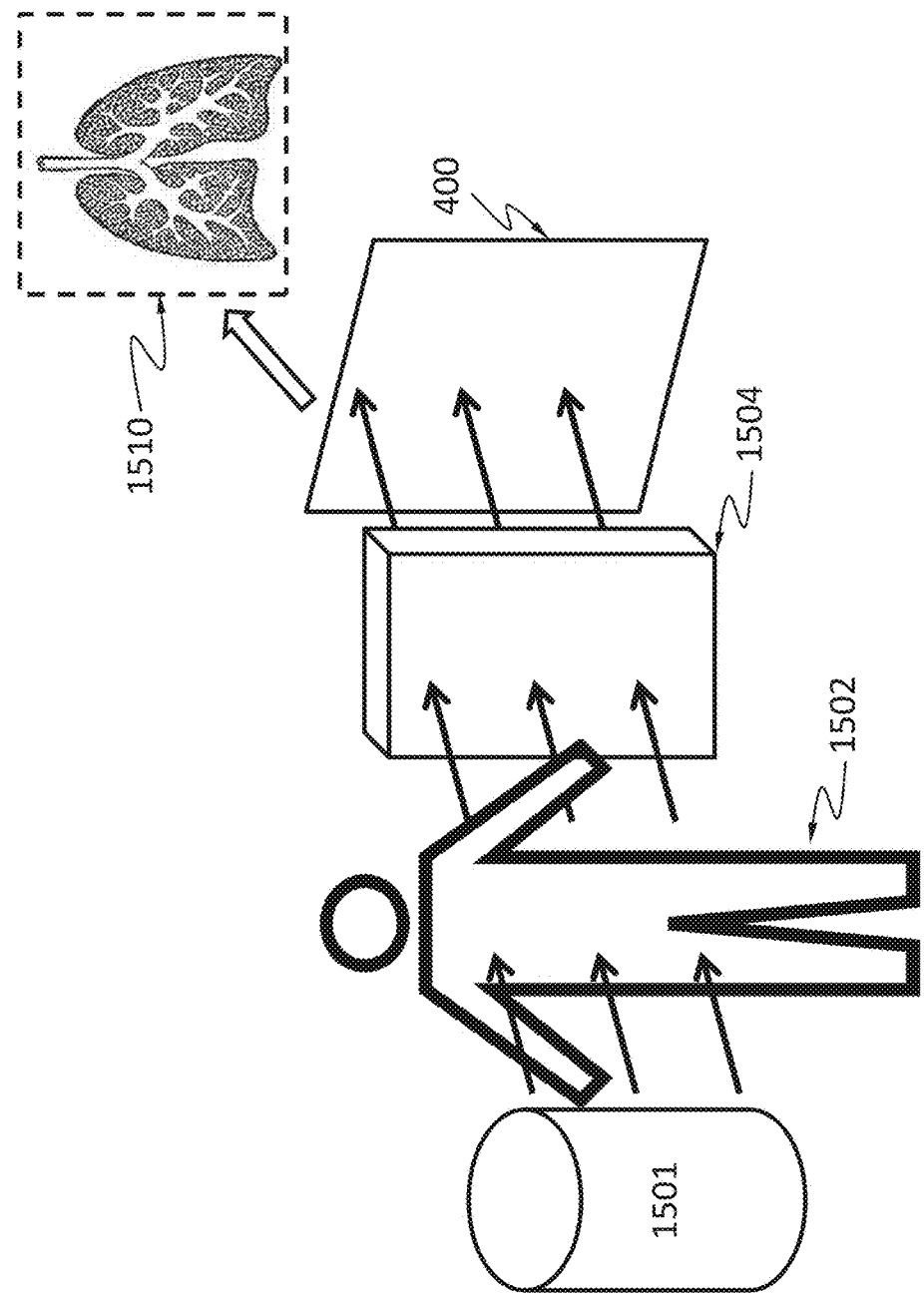
FIG. 15 schematically shows a gamma camera comprising the PMT array described herein, suitable for imaging gamma radiation in medical imaging, according to an embodiment of the present teaching.

FIG. 15 schematically shows a gamma camera comprising the PMT described herein, according to an embodiment of the present teaching. The gamma camera here includes a Gamma ray source 1501, a scintillator 1504, and an array 400 of PMTs which may be the PMTs 200 or 1000 as disclosed herein. The gamma camera may be used for imaging gamma radiation in medical applications. As shown in FIG. 15, Gamma rays emitted from the Gamma ray source 1501 penetrate a human 1502, are attenuated by different degrees by the internal structures of the human 1502 (e.g., bones, muscle, fat and organs, etc.), are converted into visible lights by the scintillator 1504, and are projected to the PMT array 400. The gamma camera may form an image of the human's body part (e.g. a lung image 1510) by detecting the intensity distribution of the Gamma rays.

Figure 16:
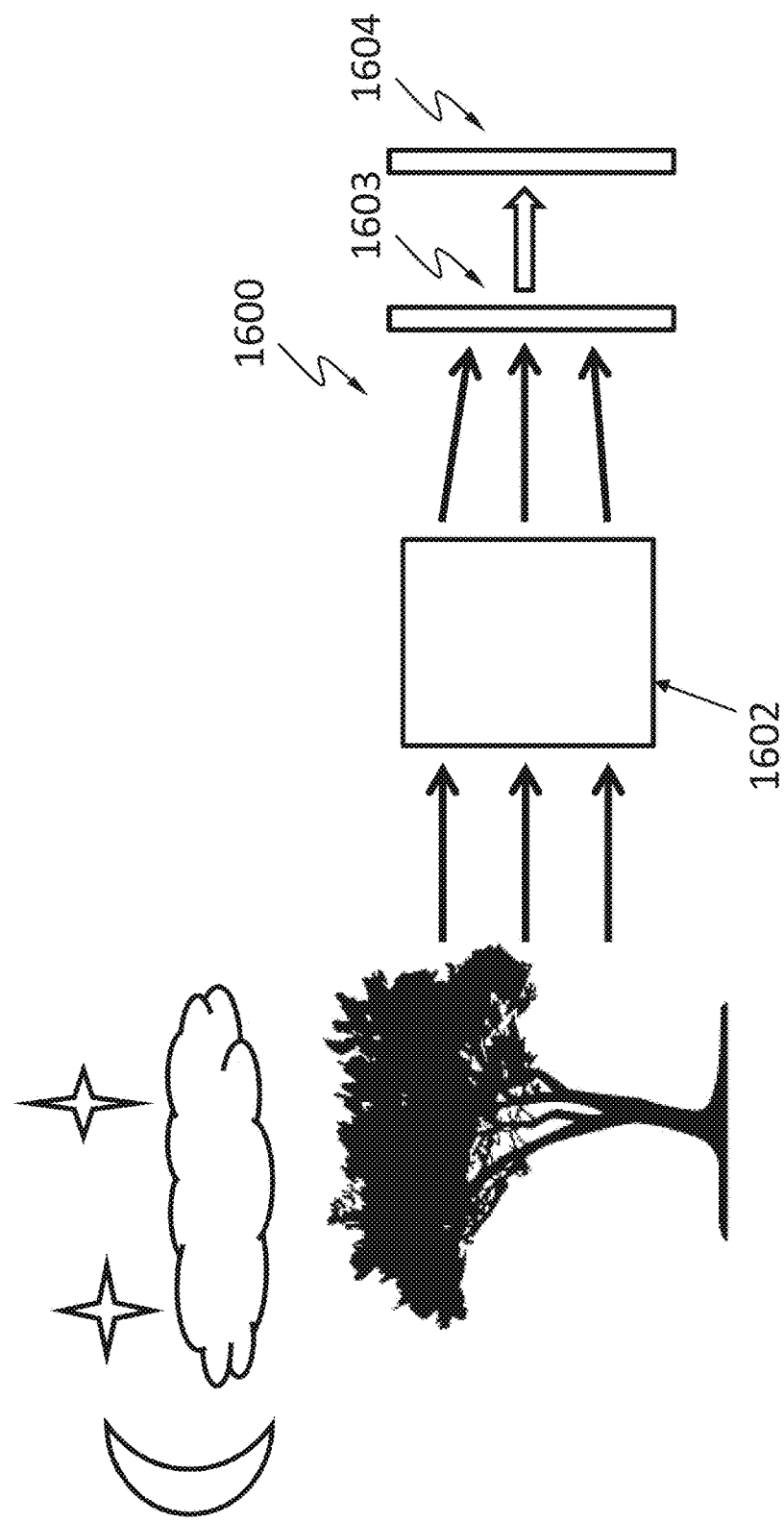
FIG. 16 schematically shows a night vision device comprising the PMT described herein, according to an embodiment of the present teaching.

FIG. 16 schematically shows a night vision device 1600 comprising the phototube described herein, according to an embodiment of the present teaching. The night vision device 1600 may be capable of producing images of a scene with levels of light approaching total darkness, e.g. when the visible light intensity is about 5 orders of magnitude less than that during the day time. The night vision device 1600 may detect weak visible light or infrared and produce images in visible light perceivable by human eyes. In this example, the night vision device 1600 includes an optical system 1602 configured to form an optical image of a scene and an image sensor 1603 with an array of the PMTs 200 or 1000 as disclosed herein. The PMTs detect the local light intensities of the optical image and convert the intensities into electrical signals. The electrical signals may then be presented on a display 1604 perceivable by human eyes.

In one embodiment, the array of PMTs in the night vision device 1600 includes sensitive PMTs as disclosed herein.

Each of the PMTs serves as a pixel, whose size can be as small as 100 µm or less, which can offer a good spatial resolution.

The PMTs 200, 1000 and the PMT array 400 described herein may have other applications such as in nuclear and particle physics, astronomy, medical diagnostics including blood tests, medical imaging, motion picture film scanning, radar jamming, high-end image scanners known as drum scanners, or any other applications of a conventional PMT.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A photomultiplier tube (PMT) suitable for detecting a photon, the PMT comprising:
   an electron ejector configured for emitting primary electrons in response to an incident photon;
   a detector configured for collecting electrons and providing an output signal representative of the incident photon; and
   a series of vertical electrodes between the electron ejector and the detector, wherein each of the vertical electrodes is configured for emitting secondary electrons in response to incident electrons, and each of the vertical electrodes is parallel to a straight line connecting the electron ejector and the detector;
   wherein the vertical electrodes are suspended in a hole in a substrate.

2. The PMT of claim 1, wherein:
   the primary electrons emitted by the electron ejector are applied as incident electrons to first vertical electrode of the series; and
   the secondary electrons emitted by one vertical electrode are applied as incident electrons to next vertical electrode of the series; except that the secondary electrons emitted by last vertical electrode of the series are applied as incident electrons to the detector.

3. The PMT of claim 1, wherein the series of vertical electrodes forms two columns of electrodes between the electron ejector and the detector, such that the primary and secondary electrons move between the two columns toward the detector.

4. The PMT of claim 1, further comprising a transparent electrode bonded to the electron ejector and configured for applying a voltage to drive the primary electrons toward the detector.

5. The PMT of claim 1, further comprising a series of horizontal electrodes between the electron ejector and the detector, wherein each of the horizontal electrodes is configured for applying a voltage to drive the secondary electrons toward the detector.

6. The PMT of claim 1, wherein each of the vertical electrodes comprises MgO, alkali antimonide, alkali halide, BeO, GaP, GaAsP, PbO or Cs₂O.

7. The PMT of claim 1, wherein the detector includes one or more electrodes and an amplifier electrically connected to the one or more electrodes.

8. The PMT of claim 1, having at least one of the following:
   a length of several microns to hundreds of microns;
   a width of several microns to hundreds of microns; and
   a height of several microns to hundreds of microns.

9. A PMT array suitable for detecting photons, comprising an array of PMTs of claim 1.

10. The PMT array of claim 9, further comprising an imaging unit configured for generating an image based on spatial resolution of the photons detected by different PMTS in the array.

11. A night vision device suitable for producing an image viewable to a human eye, the night vision device comprising:
   the PMT of claim 1,
   wherein the PMT is configured for detecting a photon from a dimly light source.

12. A method for making a PMT suitable for detecting a photon, the method comprising:
   etching a substrate to form a hole of the substrate and expose a series of vertical electrodes in the hole such that the electrodes are suspended in the hole;
   bonding a detector to bottom of the hole; and
   bonding to top of the hole a cap wafer having a transparent electrode and an electron ejector, such that the series of vertical electrodes are between the electron ejector and the detector, wherein
      the electron ejector is configured for emitting primary electrons in response to an incident photon,
      each of the vertical electrodes is configured for emitting secondary electrons in response to incident electrons,
      each of the vertical electrodes is parallel to a straight line connecting the electron ejector and the detector, and
      the detector is configured for collecting electrons and providing an output signal representative of the incident photon.

13. The method of claim 12, wherein:
   the primary electrons emitted by the electron ejector are applied as incident electrons to first vertical electrode of the series; and
   the secondary electrons emitted by one vertical electrode are applied as incident electrons to next vertical electrode of the series, except that the secondary electrons emitted by last vertical electrode of the series are applied as incident electrons to the detector.

14. The method of claim 12, wherein the series of vertical electrodes forms two columns of electrodes between the electron ejector and the detector, such that the primary and secondary electrons move between the two columns toward the detector.

15. The method of claim 12, further comprising bonding a transparent electrode to the electron ejector, wherein the transparent electrode is configured for applying a voltage to drive the primary electrons toward the detector.

16. The method of claim 12, further comprising forming a series of horizontal electrodes between the electron ejector and the detector, wherein each of the horizontal electrodes is configured for applying a voltage to drive the secondary electrons toward the detector.

17. The method of claim 12, further comprising electroplating a material on the vertical electrodes and oxidizing the material.

* * * * *